US006799720B2

(12) United States Patent
Hogan et al.

(10) Patent No.: US 6,799,720 B2
(45) Date of Patent: *Oct. 5, 2004

(54) SYSTEM FOR FORECASTING AMOUNTS OF MATERIALS NEEDED FOR CREDIT CARD REISSUE

(75) Inventors: Sharon Hogan, Omaha, NE (US); John Coleman, Omaha, NE (US)

(73) Assignee: First Data Corporation, Englewood, CO (US)

( * ) Notice: Subject to any disclaimer, the term of this patent is extended or adjusted under 35 U.S.C. 154(b) by 155 days.

This patent is subject to a terminal disclaimer.

(21) Appl. No.: 10/172,768

(22) Filed: Jun. 14, 2002

(65) Prior Publication Data

US 2003/0183688 A1 Oct. 2, 2003

Related U.S. Application Data

(63) Continuation-in-part of application No. 10/108,806, filed on Mar. 26, 2002, which is a continuation-in-part of application No. 10/109,459, filed on Mar. 26, 2002, and a continuation-in-part of application No. 10/108,217, filed on Mar. 26, 2002, now Pat. No. 6,651,884.

(51) Int. Cl.[7] .............................................. G06K 5/00
(52) U.S. Cl. ...................................... 235/380; 235/385
(58) Field of Search ................................. 235/379, 380, 235/487, 376, 385; 705/35, 38, 39, 41

(56) References Cited

U.S. PATENT DOCUMENTS

| 5,774,882 | A | | 6/1998 | Keen et al. |
|---|---|---|---|---|
| 5,819,232 | A | * | 10/1998 | Shipman ........................ 705/8 |
| 5,991,732 | A | * | 11/1999 | Moslares ........................ 705/8 |
| 6,014,645 | A | | 1/2000 | Cunningham |
| 6,105,007 | A | | 8/2000 | Norris |
| 6,119,103 | A | * | 9/2000 | Basch et al. ................... 705/35 |
| 6,158,657 | A | | 12/2000 | Hall, III et al. |
| 6,308,887 | B1 | | 10/2001 | Korman et al. |
| 6,315,193 | B1 | | 11/2001 | Hogan |
| 6,315,194 | B1 | | 11/2001 | Graef et al. |
| 6,335,799 | B1 | | 1/2002 | Provost |
| 6,402,028 | B1 | | 6/2002 | Graham, Jr. et al. |
| 6,405,181 | B2 | | 6/2002 | Lent et al. |
| 6,446,832 | B1 | | 9/2002 | Holec et al. |
| 6,651,884 | B2 | * | 11/2003 | Prendergast et al. ........ 235/380 |

* cited by examiner

*Primary Examiner*—Daniel St. Cyr
(74) *Attorney, Agent, or Firm*—Townsend and Townsend and Crew LLP

(57) ABSTRACT

A system and method for forecasting materials used in reissuing credit cards to cardholders is disclosed. The method includes the step of identifying cardholder accounts potentially eligible for reissue for a certain time period. Next, account information is analyzed to determine which ones of the potentially eligible cardholder accounts qualify for reissue. Thereafter, a projected amount of materials needed in reissuing credit cards is determined. The projected amount is based on the number of qualified cardholder accounts.

18 Claims, 2 Drawing Sheets

SYSTEM FOR FORECASTING AMOUNTS OF MATERIALS NEEDED FOR CREDIT CARD REISSUE

CROSS-REFERENCES TO RELATED APPLICATIONS

This application is a continuation-in-part of U.S. application Ser. No. 10/108,806, entitled "Method and Systems for Processing Credit Card Reissue Transactions," filed Mar. 26, 2002, which is a continuation-in-part of U.S. application Ser. No. 10/109,459, entitled "System for Card Processing, Embossing and Fulfillment", filed Mar. 26, 2002, and is a continuation-in-part of U.S. application Ser. No. 10/108,217, entitled "System for Ranking Card Reissue Transactions", filed Mar. 26, 2002, now U.S. Pat. No. 6,651,884; all of the complete disclosures of which are herein incorporated by reference.

BACKGROUND OF THE INVENTION

This invention relates generally to the field of card issuance units and reissue processing. More specifically, the invention relates to forecasting an amount of material, such as plastics and inserts, that will be required to fulfill card issuance units (e.g., credit cards, smart cards, phone cards and the like).

Reissue processing refers to renewal of card issuance units (CIUs) prior to expiration. CIUs are credit cards, smart cards or the like, alone, or in combination with card carriers, personal information number mailers, etc. CIUs are often provided by various institutions to their customers. For example, a bank may issue a credit card for use by its customer upon credit approval. These credit cards may be produced by third parties often unrelated to the institution. When a credit card is desired, the institution forwards the cardholder's information to a third party for embossing. The third party then embosses the cardholder information on the credit card, all on behalf of the institution. Embossing refers to imprinting the cardholder's name and account number, etc., on the credit card. After embossing, the credit card is forwarded to the cardholder for use.

As generally known, credit cards often expire after a certain duration. Prior to expiration, the cardholder's record is generated by the third party. An eligibility review is conducted to determine if the cardholder is eligible for reissue. If the cardholder's account is eligible, a new credit card is embossed to replace the old one. These reissued credit cards are often embossed on plastic stock or other such materials. Presently, little or no forecasting tools exist to determine the amount of material needed to fulfill reissue credit cards. This situation may result in either a shortfall or a surplus of materials needed to fulfill the reissue credit cards.

It is therefore advantageous to reduce costs, facilitate credit card reissue, and optimize storage space by forecasting the amount of materials needed for fulfilling reissue credit cards.

BRIEF SUMMARY OF THE INVENTION

The invention provides systems and methods for forecasting amounts of materials needed to produce reissue CIUs. One type of material is a plastic stock on which the reissue credit cards are embossed. Another type of material is a card carrier for mailing the reissue credit card. Advantageously, by forecasting the amounts of materials needed for reissue, proper inventory levels may be maintained. Various embodiments of the present invention are disclosed.

In a first embodiment, a method of the present invention forecasts the amount of material used when reissuing credit cards. Initially, a time period during which inventory levels are monitored is determined. The selected time period may be, for example, a six-month period beginning two months from the current month and extending to the eighth month. As another example, it may be a twelve-month period beginning from the current month.

After a time period is selected, cardholder accounts that are potentially eligible for reissue are identified. Cardholder accounts are potentially eligible for reissue if their renewal dates fall within the selected time period. This step identifies the maximum number of potentially eligible cardholders for the selected time.

Next, account information for the potentially eligible cardholders is analyzed to determine which ones of the potentially eligible cardholder accounts qualify for reissue. Conveniently, current account information such as cardholder spending habits, compliance with credit limits, etc., may be used to determine eligibility. In this manner, the present invention provides a forecast of the number of qualified (i.e. eligible) cardholder accounts that may pass reissue review during the selected period. After the number of qualified cardholder accounts are determined, the amount of materials needed for the reissue process is projected. The amount of materials may be the sum of all of the materials required for each qualified cardholder account. Hence, the amount of materials projected is based on the number of qualified cardholder accounts rather than the number of potentially eligible cardholder accounts. In this manner, the present invention provides a more accurate assessment of the amount of materials required for reissuing credit cards.

In an alternate embodiment, the invention provides a method for monitoring inventory levels. The inventory levels relate to materials used during credit card reissue processes. Advantageously, by monitoring current inventory levels, the proper inventory level for fulfilling reissue orders can be maintained.

The method includes the step of identifying cardholders eligible for reissue for a certain time period. For example, if a period of twelve months is selected, cardholders having renewals dates within the twelve month period are eligible for reissue. The time period may vary as desired. Next, the method includes the step of qualifying one or more of the eligible cardholders for reissue. The qualifying step may be accomplished by assessing current cardholder characteristics, for example. Next, the step of determining the amount of material needed for reissuing credit cards is implemented. Advantageously, the amount of material is projected based on the number of qualified cardholders. Thereafter, the method includes the step of comparing the projected amount with the current amount of materials available. In this fashion, the present invention determines whether a shortfall or surplus exists, such that appropriate action is taken to rectify the inventory level.

A further embodiment of this invention may be found in a system for forecasting amounts of materials needed to produce reissued credit cards. Among other components, the system includes software instructions for selecting a time period, and for identifying cardholders eligible for reissue for the selected time period. Also, the system includes software instructions for analyzing account information for the eligible cardholders to determine which ones of the eligible cardholders qualify for reissue, and for determining a projected amount of material needed for producing the credit cards based on the number of qualified cardholders.

A further understanding of the nature and advantages of the present invention may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Figure 1:
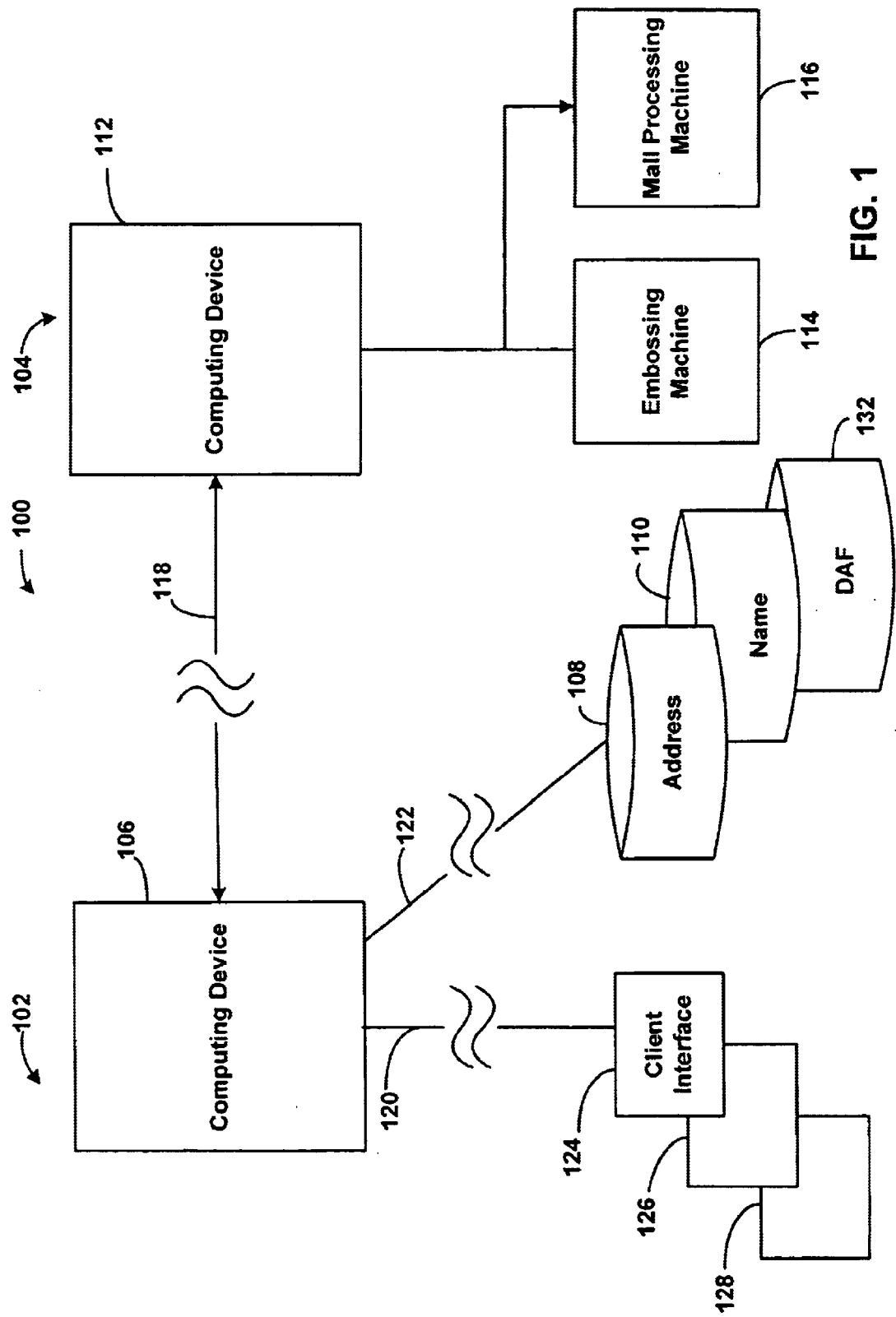
FIG. 1 illustrates a CIU system for processing reissue requests, and for forecasting amounts of materials in connection with reissue credit cards according to a first embodiment of the present invention.

The invention provides systems and methods for forecasting amounts of materials needed to produce reissue credit cards. The invention may be used with reissue processing as described in co-pending U.S. patent application Ser. No. 10/108,806, entitled "Method and System For Processing Card Reissue Transactions" filed Mar. 26, 2002 and U.S. patent application Ser. No. 10/108,217, entitled "System for Ranking Card Reissue Transactions", filed Mar. 26, 2002. All of the above complete disclosures are incorporated herein by reference as if fully set forth in the present specification.

The present invention forecasts the amounts of materials needed for producing CIUs in order to reduce costs, maintain proper inventory levels and facilitate production of the CIUs. Although the invention is described with reference to credit cards, one of ordinary skill in the art will realize that the present invention is applicable to CIUs (CIUs include those materials we are tracking) and other polymer-type cards. The invention is operable using one or more computing systems suitably programmed with one or more software instructions.

In one embodiment, this method of forecasting is initiated by selecting a time period over which inventory levels are to be monitored. The time period may be, for example, a six-month period beginning two months from the current month and extending to the eighth month. Or, it may be a twelve-month period extending from the current month. However, other time periods may be used as well.

After a time period is selected, cardholders eligible for reissue are identified. Cardholders are eligible if their renewal dates fall within the selected time period. This step identifies the maximum number of eligible cardholders for the selected time period since no criteria other than renewal dates are used for identifying the eligible cardholders.

Next, account information for the eligible cardholders is analyzed to determine which cardholders qualify for reissue. Conveniently, current account information such as cardholder spending habits, compliance with credit limits, etc., may be used to determine eligibility. Further, cardholders may be qualified according to criteria in a PCF (product control file) or an ACF (adaptive control file). PCF includes eligibility criteria for determining whether cardholders are in good standing, and are eligible for reissue. Such criteria may include number of times delinquent, number of times overlimt, number of times both delinquent and overlimit, percent overlimit, state of residence, etc.

ACS compares spending habits, high balance, lateness, etc. and assigns a behavior score for determining whether the cardholder is eligible for reissue. These techniques are more fully described in the co-pending related U.S. application Ser. No. 10/108,217, entitled "System for Ranking Card Reissue Transactions," filed Mar. 26, 2002 by the assignee of the present invention, the disclosure of which is hereby incorporated by reference as if fully set forth in the present Specification.

In this manner, the present invention provides a forecast of the number of cardholders that may pass reissue eligibility when the time for renewal arrives. Based on the number of qualified cardholders, the amount of materials needed for producing the reissue CIUs is projected. As such, the amount of material projected is based on the number of qualified card holders rather than the number of eligible cardholders. Therefore, a more accurate assessment of the amount of material is achieved. Further, the projected amount may be compared to current inventory levels to determine the appropriate action to take.

FIG. 1 illustrates a CIU system for processing reissue requests, and for forecasting amounts of materials according to a first embodiment of this invention. Among other components, CIU system 100 comprises a mainframe system 102 and a production facility system 104. Mainframe system 102 comprises a first computing device 106 for electronically receiving modifications to cardholder records from client interfaces 124, 126, 128; and for building information necessary for fulfilling reissue transactions. Computing device 106 may be a VAX/VMS or the like available from DEC® (Digital Equipment Corporation). Computing device 106 may execute one or more software applications stored in its memory. One such application is CIU forecasting 130 for forecasting materials needed with regard to reissue processing. Although this embodiment is not shown, one of ordinary skill in the art will realize that CIU forecasting 130 may be implemented using solely hardware or a combination of software and hardware.

Mainframe system 102 further comprises an address database 108 for storing cardholder addresses; a name database 110 for storing cardholder names; and a DAF (data access facility) database 132 for storing reissue account information used for material forecasting in accordance with the present embodiment.

Production facility system 104 comprises a second computing device 112 for processing and fulfilling reissue transactions in conjunction with first computing device 106; and an embossing machine 114 for embossing CIUs with cardholder information. Production facility system 104 further includes a mail processing machine 116 for generating card carriers, and for attaching the carriers to CIUs. These are inserted along with other CIU components into an envelope for mailing to the cardholder. Computing device 112 is typically an AS/400 computing device by IBM® (International Business Machines). One of ordinary skill in the art will realize that other computing devices within the spirit and scope of the present invention may be employed.

Computing device 106 is communicably coupled to computing device 112 via a communication link 118. Communication link 118 may be a cable (e.g., RS232) or wireless link for example.

In use, reissue processing will now be described, followed by material forecasting which will be described with reference to FIG. 2. Prior to expiration of credit cards, cardholder reissue records are generated for cardholders in good standing. These records may be generated by mainframe 106 about one month prior to expiration. The records contain cardholder information from various databases. These databases include address database 108 (FIG. 1) for storing cardholder addresses, and name database 110 for storing cardholder names. Although not shown, various other types of information may be stored in other databases. After the cardholder records are generated, they are forwarded to the production facility.

At the facility, the records are selected by operators to begin the embossing process. The record is typically selected when the production facility has the capacity (equipment, personnel, etc.) to begin fulfillment of the credit card, although selection can occur earlier. The selected records are run through an eligibility process to determine whether the cardholders are still eligible for reissue. If the cardholders remain eligible, the records are used to fulfill reissue of the credit cards.

Fulfillment is implemented using embossing machine 114 and mail processing machine 116. Embossing machine 114 receives cardholder information such as names, account numbers, expiration dates, encoding information, etc. These are physically imprinted on the credit cards. Mail processing machine 116 receives card carrier information such as mailing addresses, account numbers, cardholder names, credit limits, etc., for printing on card carriers. Next, credit cards and card carriers are matched for insertion into envelopes, and for mailing to cardholders.

Mail processing machine 116 includes components for achieving this function. Although not shown, such components may include a paper feeding mechanism for feeding sheets to a bin for receiving paper from the paper feeding mechanism; and a printer for printing alphanumeric characters on the paper. One non-limiting example of how mail processing machine 116 may be constructed is disclosed in a U.S. application Ser. No. 10/045,589 entitled "Systems and Methods for Providing Inserts into Envelopes," filed Nov. 8, 2001 by the assignee of the present invention, the aforementioned application being hereby incorporated by reference as if fully set forth in the present invention. While this invention is described with reference to credit cards, one of ordinary skill in the art will realize that the present invention is applicable to other polymer type cards, namely smart cards, phone cards and the like.

In another aspect, cardholder reissue records are generated by computing device 106 and are subsequently used to forecast the amount of materials needed for reissuing credit cards. The number of records generated depends on a selected time period. For example, records scheduled for reissue beginning two months from the current month and extending for six months may be generated. Or, periods of twelve months may be selected as desired. The generated records are then used for determining materials required for reissuing CIUs as further described with reference to FIG. 2.

Figure 2:
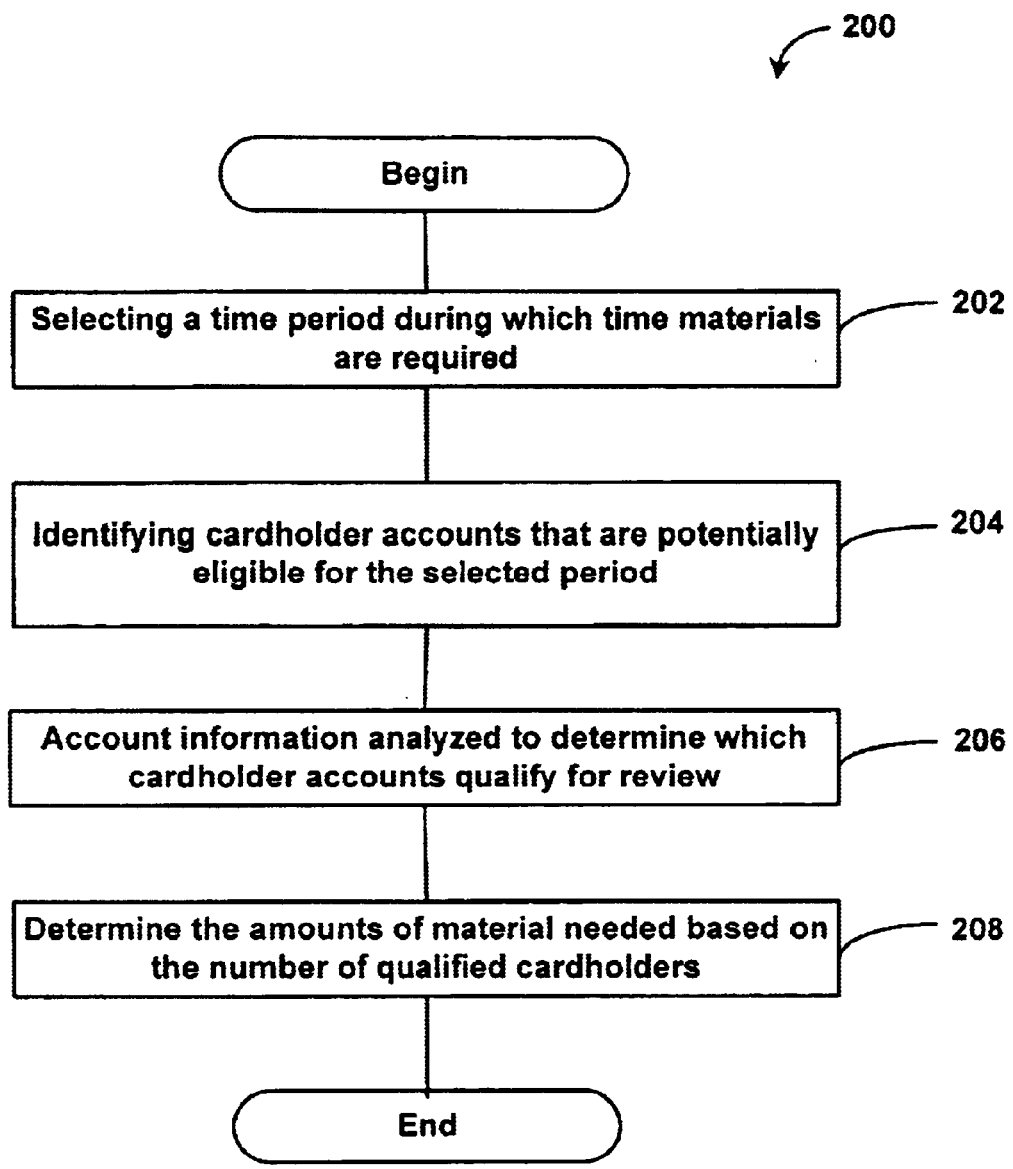
FIG. 2 illustrates a method for forecasting material amounts for reissuing credit cards according to an embodiment of the present invention.

FIG. 2 illustrates a method 200 for forecasting the amount of materials needed to reissue credit cards according to an embodiment of the present invention. Such materials may include, for example, plastic stock, inserts, mailers, and the like.

At block 202, method 200 comprises selecting a time period during which these materials will be needed. This period may hard coded within CIU forecasting 130, for example. Or, it may be input manually by system operators via an input device (not shown).

The selected time period may be fixed or variable depending on the amount of consumer information available. For example, a time period beginning two months from the current month and extending for six months may be selected. Alternatively, a period beginning one month from the current month and extending for one year may be selected. Further still, a two-year period from the current month may be selected.

At block 204, cardholder accounts potentially eligible for reissue for the selected time period are identified. Potentially eligible cardholder accounts are those accounts having renewal dates falling within the selected time period. This step thus determines the maximum number of cardholder accounts that could reissue for the selected period.

At block 206, account information is analyzed by CIU forecasting 130 to determine which of the potentially eligible cardholders qualify for reissue. Various criteria such as cardholder behavioral patterns, credit limit compliance, etc., are examined. Further, cardholders may be qualified according to criteria in a PCF (product control file), or an ACS (adaptive control system).

Although the PCF generally contains parameters to control various segments of CIU processing, it may include eligibility criteria for determining whether cardholders are in good standing and are potentially eligible for reissue. Such criteria may include cardholder spending patterns, number of times delinquent, etc.

ACS contains criteria for determining a behavioral score based on cardholder patterns. For example, for credit cards, ACS compares spending habits, high balance, lateness, etc. and assigns a behavior score for determining whether the cardholder is eligible for reissue. While ACS examines lower-level details, PCF uses higher-level information about cardholders. It should be noted that with either ACS or PCF, the cardholder accounts validate against client-specified criteria. These techniques are more fully described in the co-pending related U.S. application Ser. No. 10/108,217 entitled "System for Ranking Card Reissue Transactions," filed Mar. 26, 2002 by the assignee of the present invention, the disclosure of which is hereby incorporated by reference as if fully set forth in the present invention.

After the qualified (i.e. eligible) cardholder accounts are identified, both the qualified and nonqualified accounts are stored in DAF database 132. Other data for these accounts are stored as well. Such data includes client bank identifier, plastic expiration date, control cycle identifier, monthly tape number, system bank identifier, principal bank identifier, agent bank identifier, card issuance strategy name, card activation method name, current pricing strategy code, PCF plastic products strategy name, card carrier method name, mailer management method name, plastic appearance method name, PCF reissue strategy name, plastic type code, plastic stock identifier, plastic stock count, card carrier form number, and card carrier form count.

One of ordinary skill in the art will realize that various other information may be stored by DAF database 132. For example, the database may include a pin mailer form identifier, pin mailer form count, phone label stock number, card activation label count, composition form type code, embossing type code, plastic mail code, process type, account identifier, plastic count, cardholder name, duality code, reissue qualification code and reissue action reason code.

Clients using client interfaces 124, 126, 128 may access DAF database 132 via BRIO, a third party software tool for querying databases. BRIO has options to create charts, graphs, and reports from the reissue forecast data according to individual client requirements.

At step 208, method 200 comprises the step of determining the amount of material needed for producing the reissue CIUs based on the number of qualified cardholders. The amount of plastic material needed is a straightforward sum of all of the materials needed for each qualified cardholder account. In addition to the amount of plastic material needed for reissue cards, the data stored in DAF database 132 may be used to identify other amounts of materials needed for card carriers, inserts, mailers, card activation labels, for example. Herein lies one advantage of the present invention. The amount of material projected is based on the number of qualified card holders and not on the number of potentially eligible cardholders. Therefore, a more accurate assessment of the amount of material is achieved.

Further, a report template for accessing plastics inventory information in DAF database 132 is provided. Projected inventory requirements may be compared to current inventory to predict inventory shortfalls or surplus inventory. Also, this data may be employed for identifying specific accounts both eligible and ineligible for reissue, and the reason for ineligibility, in order to target specific marketing campaigns for those accounts. Advantageously, the data will be periodically refreshed with new data for the selected time period. For example, if the selected period is six months, each month the data may be refreshed with new six-month forward data.

While the above is a complete description of exemplary specific embodiments of the invention, additional embodiments are also possible. For example, although the present invention has been described with reference to reissue processing, ranking may used with processing new cardholders. Thus, the above description should not be taken as limiting the scope of the invention, which is defined by the appended claims along with their full scope of equivalents.

What is claimed is:

1. A method for forecasting materials used in reissuing credit cards to cardholders, the method comprising:
   identifying cardholder accounts potentially eligible for reissue for a certain time period;
   analyzing account information to determine which ones of the potentially eligible cardholder accounts qualify for reissue; and
   determining a projected amount of materials needed in reissuing credit cards based on the number of qualified cardholder accounts.

2. The method of claim 1 further comprising estimating current inventory levels of materials based on the projected amount of materials.

3. The method of claim 1 wherein the account information includes client selected criteria.

4. The method of claim 1 further comprising comparing the projected amount with a current amount of materials available in order to determine whether a material shortfall or surplus exists.

5. The method of claim 1 wherein the material comprises plastic stock for producing the reissued credit cards.

6. The method of claim 5 further comprising determining a projected amount of inserts for use with the credit cards.

7. The method of claim 5 further comprising determining a projected amount of card carriers for carrying the credit cards.

8. A method for monitoring inventory levels of materials when reissuing credit cards, the method comprising:
   identifying cardholder accounts eligible for reissue for a certain time period;
   qualifying one or more of the eligible cardholder accounts for reissue;
   determining a projected amount of materials used when reissuing credit cards based on the number of qualified cardholder accounts; and
   comparing the projected amount with a current amount of materials available in order to determine whether a material shortfall or surplus exists.

9. The method of claim 8 wherein the materials are selected from a group consisting of plastics, card carriers, inserts, card activation labels and mailers.

10. The method of claim 8 wherein the act of qualifying one or more eligible cardholder accounts comprises analyzing account information for the eligible cardholders to determine which cardholders qualify for reissue.

11. The method of claim 10 wherein the account information includes client selected criteria.

12. A system for forecasting an amount of materials used when reissuing credit cards for cardholders, the system comprising:
    memory;
    processor for executing program code in said memory;
    program code for identifying cardholder accounts eligible for reissue for a certain time period;
    program code for analyzing account information for the eligible cardholders to determine which ones of the eligible cardholder accounts qualify for reissue; and
    program code for determining a projected amount of materials needed for producing the credit cards based on the number of qualified cardholders.

13. The system of claim 12 wherein the account information includes client selected criteria.

14. The system of claim 12 further comprising program code for comparing the projected amount with a current amount of materials available in order to determine whether a material shortfall or surplus exists.

15. The system of claim 12 wherein the material comprises plastic stock for producing the reissued credit cards.

16. The system of claim 15 further comprising program code for determining a projected amount of inserts.

17. The system of claim 12 wherein the material comprises mailers.

18. The system of claim 12 wherein the material comprises card activation labels.

* * * * *